INVENTOR
VIRGIL A. EHRESMAN
BY Thomas J. Nikolai
ATTORNEY

United States Patent Office 3,559,191

Patented Jan. 26, 1971

3,559,191

THIN-FERROMAGNETIC-FILM MEMORY ELEMENT USING RF MIXING FOR READOUT OPERATION

Virgil A. Ehresman, Minneapolis, Minn., assignor to Sperry Rand Corporation, New York, N.Y., a corporation of Delaware Filed Mar. 1, 1967, Ser. No. 619,832

Int. Cl. G11c *11/14, 5/02, 7/00*

U.S. Cl. 340—174 8 Claims

ABSTRACT OF THE DISCLOSURE

A thin-ferromagnetic-film memory element utilizing a plurality of concurrent RF longitudinal drive fields and a pulse-like DC transverse drive field for providing a resultant sum-frequency readout signal the polarity phase of which is indicative of the informational state of the memory element.

BACKGROUND OF THE INVENTION

The present invention utilizes as memory elements thin-ferromagnetic-films such as fabricated in accordance with the S. M. Rubens Pat. No. 2,900,282 and assembled into three dimensional memory arrays such as disclosed in the S. M. Rubens et al. Pat. No. 3,030,612 and Pat. No. 3,155,561. Such thin-ferromagnetic-films may, or may not, exhibit single-domain properties providing single-domain rotational switching, but shall preferably possess the property of unaxial anisotropy. The term "single-domain property" may be considered the characteristic of a three-dimensional element of magnetizable material having a thin dimension that is substantially less than the width and length thereof wherein no domain walls can exist parallel to the large surface of the element. When such films possess the property of unaxial anisotropy there is provided in the place of the film an axis, termed an easy axis, along which the remanent magnetization thereof shall lie.

Two publications, "System and Fabrication Techniques for a Solid State Random Access Mass Memory," H. W. Fuller et al., Proceedings of the Intermag Conference, 1964, pages 5–5–1 through 5–5–4 and "Instrument for Observation of Magnetization Vector Position in Thin Magnetic Films," C. J. Bader et al., The Review of Scientific Instruments, vol. 33, No. 12, December 1962, pages 1429 through 1435, have disclosed systems utilizing a two-frequency RF selection scheme for the reading operation of a thin-ferromagnetic-film. These publications propose the use of coincident X and Y selection frequencies $F_1$ and $F_2$ whereby the memory element only at the intersection of the selected X and Y lines is concurrently energized by the two RF signals whereby the selected core acts as a non-linear mixing element producing a sum-frequency component of frequency $F_1+F_2$. The polarity phase of the sum-frequency sense, or output, signal is 0 or $\pi$ radians depending on the informational state of the memory element, i.e., whether or not it stores a "1" or a "0." The phase of the output signal is detected against a reference signal frequency $F_1+F_2$ that is derived from the same signal sources as the read drive signals with the phase detector output consisting of a positive or a negative pulse depending upon the informational state of the memory element. The present invention is considered to be an improvement over that of the above referenced publications providing an improved operating magnetizable memory element that may be utilized as either an analog or a digital recording instrument.

SUMMARY OF THE INVENTION

The present invention in its preferred embodiment utilizes as the memory element a thin-fierromagnetic-film having a single-domain properties and possessing the characteristic of unaxial anisotropy providing an easy axis along which the magnetization thereof shall lie.

The write operation utilized by the present invention consists of the concurrent application of a DC transverse write drive field and a first or a second and opposite polarity DC longitudinal write drive field for establishing the magnetization of the memory element in a first or a second and opposite polarization along the element's easy axis. This write operation is as disclosed in the above discussed S. M. Rubens et al. Pat. No. 3,030,612. The read operation utilized by the present invention consists of the concurrent application of at least two different frequency RF longitudinal read drive fields and a DC, or pulse-like, transverse read drive field providing a resultant sum-frequency RF output signal therefrom the polarity phase of which is indicative of the informational state of the selected memory element.

Additionally, the present invention may be utilized to determine the partially switched flux level of a thin-ferromagnetic-film memory device utilized as an analog storage detector as in the copending patent application of R. A. White et al., Ser. No. 456,365, filed May 17, 1965, now Pat. No. 3,457,554 and assigned to the Sperry Rand Corporation, as is the present invention. Such analog storage device involves the method of operation of a thin-ferromagnetic-film memory element wherein the film's dispersion curve is utilized to permit the storage of discrete levels of sampled data as a function of the degree of the rotation of the film's magnetization when subjected to concurrent longitudinal and transverse drive field switching components. In both arrangements, wherein the thin-ferromagnetic-film memory element is utilized as a digital storage device or as an analog storage device, readout is by the application of coincident longitudinal AC and transverse DC drive fields to achieve nondestructive readout of the informational state of the thin-ferromagnetic-film device. Accordingly, it is a primary object of the present invention to provide a novel magnetizable memory element and a method of operation thereof.

DESCRIPTION OF THE PREFERRED EMBODIMENTS

Figure 1:
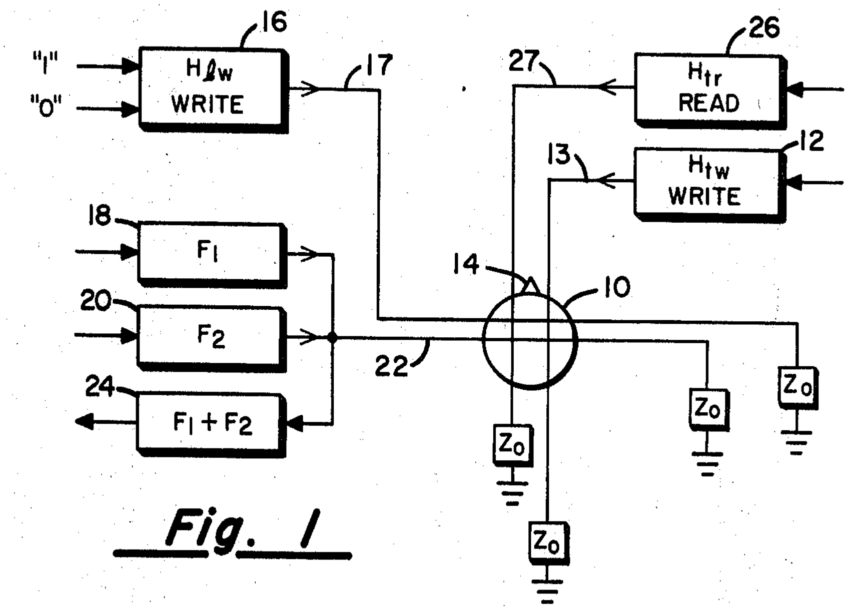
FIG. 1 is an illustration of a first embodiment of the present invention.

With particular reference to FIG. 1 there is illustrated a first embodiment of the present invention wherein there is utilized a thin-ferromagnetic-film memory element 10 having single-domain properties and the characteristic of unaxial anisotropy. The writing operation utilized by this embodiment consists of $H_{tw}$ write source 12 coupling a DC transverse write drive field $H_{tw}$ of an intensity in the area of element 10 that is equal to or greater than the $H_k$ of the element 10, i.e., $H_{tw} \geqslant H_k$. This transverse write drive field rotates the magnetization M of element 10 out of alignment with the easy axis 14 and is of such an intensity as to provide substantial irreversible switching of the magnetization M of element 10 such that the magnetization M of element 10 is preferably aligned substantially along it's hard axis, i.e., orthogonal to its easy axis, and in the plane of the element 10. Next, and coincident at least in part with the application of the transverse write drive field, $H_{tw}$, $H_{1w}$ write source 16 couples a DC longitudinal write drive field $H_{1w}$ to memory element 10 in a first or a second and opposite direction along the easy axis 14 thereof for the writing of a "1" or of a "0" therein. This writing operation may be similar to that method disclosed in the above discussed S. M. Rubens et al. Pat. No. 3,030,612.

Figure 2:
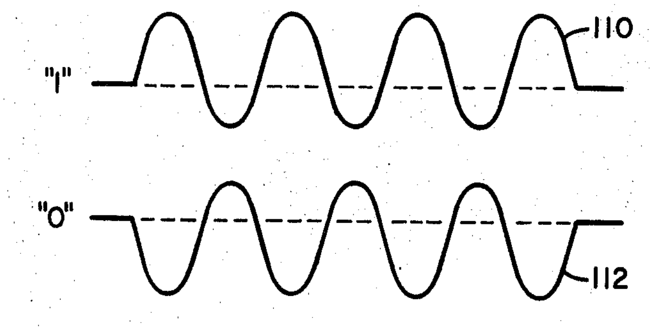
FIG. 2 is an illustration of the waveforms of the output signals, representative of a stored "1" and "0," of the embodiment of FIG. 1.

The reading operation utilized by the present embodiment consists of the application of two different frequency RF longitudinal read drive fields $H_{1r}$ of frequencies $F_1$ and $F_2$ by $F_1$ source 18 and $F_2$ source 20. These two different frequency RF longitudinal read drive fields $F_1$ and $F_2$ produce a corresponding excitation of the flux of element 10 causing a sum-frequency component of flux to be generated therein. The intensities of these two longitudinal read drive fields $F_1$ and $F_2$ are such that without the concurrent application of a transverse drive field to element 10 no substantial rotation of the magnetization M of element 10 is achieved. Thus, no substantial sum-frequency signal $F_1+F_2$ is coupled back into the common bit-sense line 22 and thence into $F_1+F_2$ detector 24 whereby no significant signal is emitted therefrom. This insubstantial sum-frequency signal $F_1+F_2$ generated by the application of drive fields $F_1$ and $F_2$ alone is termed a non-read field and is discussed in more detail with respect to the embodiments of FIGS. 3 and 4. Next, and concurrent with the application of the two different frequency RF longitudinal read drive fields $F_1$ and $F_2$, $H_{tr}$ read source 26 couples a DC transverse read drive field $H_{tr}$ to element 10. The intensity of this transverse read-drive field $H_{tr}$ is selected to be less than the $H_k$ of element 10, i.e., $H_{tr}<H_k$. Accordingly, it produces no irreversible switching but it does provide reversible switching of the magnetization M of element 10 when combined with the longitudinal read drive fields $F_1$ and $F_2$. FIG. 2 illustrates the nature of the output signals for a stored "1" or "0" induced in line 22.

The drive lines 13, 17, 22 and 27 that are coupled to element 10 are illustrated as being terminated by their characteristic impedances $Z_0$ for purposes of optimizing the transmission characteristics thereof and minimizing the intercoupling of the other drive lines therebetween. Accordingly, although such characteristic impedances are illustrated as a single symbol $Z_0$ it is to be understood that such impedances are not necessarily similar but each are dictated by the requirements of the specifically associated drive line. This comment is equally applicable to all illustrated embodiments of the present invention.

Figure 3:
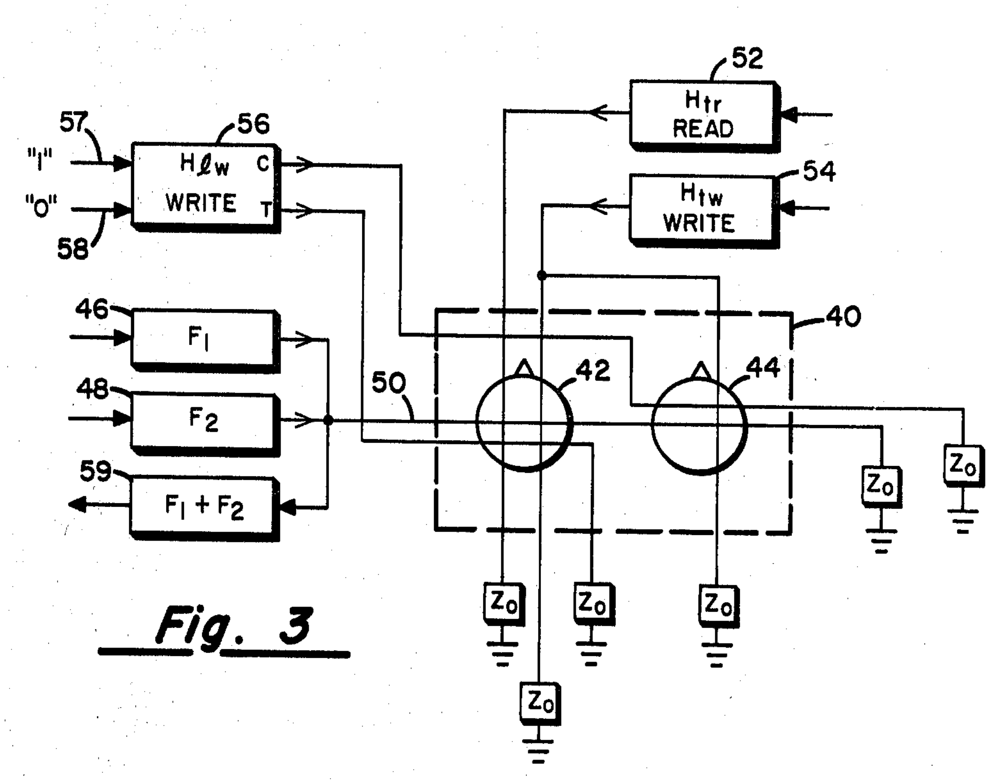
FIG. 3 is a second embodiment of the present invention utilizing a two-core-per-bit memory device.

With particular reference to FIG. 3 there is illustrated a second embodiment of the present invention in which memory device 40 includes two thin-ferromagnetic-film elements 42, 44 each of which may be similar to element 10 of FIG. 1. This embodiment may be considered to be analogous to a two-core-per-bit memory device whereby there is stored in element 42 the true of the information stored in device 40 and in element 44 there is stored the complement of the information stored in device 40. By the storing of the true and of the complement of the information stored in the associated memory device there is produced a self-cancelling effect therein by the non-read fields produced by longitudinal read drive fields $F_1$ and $F_2$ alone. In an embodiment of the present invention wherein $F_1$ source 46 and $F_2$ source 48 are continuously running oscillators all the memory elements 40 along the associated common bit-sense line 50 would be continuously subjected to a non-read field produced thereby. This conjoint effect of longitudinal read drive fields $F_1$ and $F_2$ above is termed a non-read field for, as discussed above, it alone is unable to achieve a recognizable readout of the coupled memory element.

As discussed with particular reference to FIG. 1 there is required the concurrent application, to the so-affected memory element, of a transverse read drive field by $H_{tr}$ read source 52 to produce a substantial readout of the informational state of the conjointly effected memory element. Although this non-read field produces an insignificant effect upon a single memory element, a common bit-sense line coupled to a large plurality of such memory elements would be subjected to a like plurality of such non-read fields. This plurality of non-read fields may be of a sufficient accumulative effect to substantially cancel out, or block out, the single readout field $F_1+F_2$ produced by the reading out of a single memory element along such common read-sense line. This cancelling effect of the equal but opposite fields coupled to the common bit-sense line by the true and the complement of the informational state of a memory device 40 is as illustrated in FIG. 2 whereby it is shown that the output signal $F_1+F_2$ for the true and the complement, i.e., a "1" and "0," are of an equal but opposite magnitude producing a self-cancelling zero non-read field coupling the common bit-sense line.

The write operation utilized by the embodiment of FIG. 3 consists of the initial application of a DC transverse write drive field $H_{tw}$ to elements 42 and 44 by $H_{tw}$ write source 54. This transverse write drive field is of the same nature as that described with respect to the embodiment of FIG. 1. Concurrent with the application of the transverse write drive field $H_{tw}$ coupled to elements 42 and 44, longitudinal write drive source 56 couples DC current signals of equal intensities but of opposite polarities oriented along the easy axes of elements 42 and 44 for establishing the magnetization M in elements 42 and 44 in opposite directions of polarization. As an example of the above, if a "1" is to be written into memory device 40, "1" trigger 57 is energized by an appropriate signal whereby $H_{1w}$ write source 56 is caused to emit a first polarity pulse from its true terminal T causing the magnetization M of element 42 to be set in a downward direction indicative of the writing of a "1" therein. Concurrently therewith $H_{1w}$ write source 56 is caused to emit a second and opposite polarity current signal from its complement terminal C causing the magnetization M of element 44 to be set in an upward direction along its easy axis indicative of the writing of a "0" therein. It is apparent that for the writing of a "0" in memory device 40, "0" trigger 58 may be energized by a like trigger signal for causing $H_{1w}$ write source 56 to emit opposite polarity current pulses from their true and complement terminals for setting the magnetization M of element 42 in an upward direction indicative of the storing of a "0" therein and for the setting of the magnetization M of element 44 in a downward direction indicative of the storing of a "1" therein, which "0" and "1" are the true and the complement of the informational state "0" as stored in memory device 40.

The read operation utilized by the embodiment of FIG. 3 is similar to that of the embodiment of FIG. 1 whereby, with $F_1$ source 46 and $F_2$ source 48 being continuous operating multivibrators, or oscillators, and coupling their corresponding longitudinal read drive fields $F_1$ and $F_2$ to the common bit-sense line 50 the concurrent application of a transverse read drive field pulse to element 42 by $H_{tr}$ read source 52 causes the sum-frequency output signal $F_1+F_2$ to be induced in common bit-sense line 50. This output signal, represented by the sum-frequency signal $F_1+F_2$, is likewise coupled to the $F_1+F_2$ discriminator 59 which as in FIG. 1 is preferably a $F_1+F_2$ frequency bandpass filter emitting a corresponding read signal therefrom.

Figure 4:
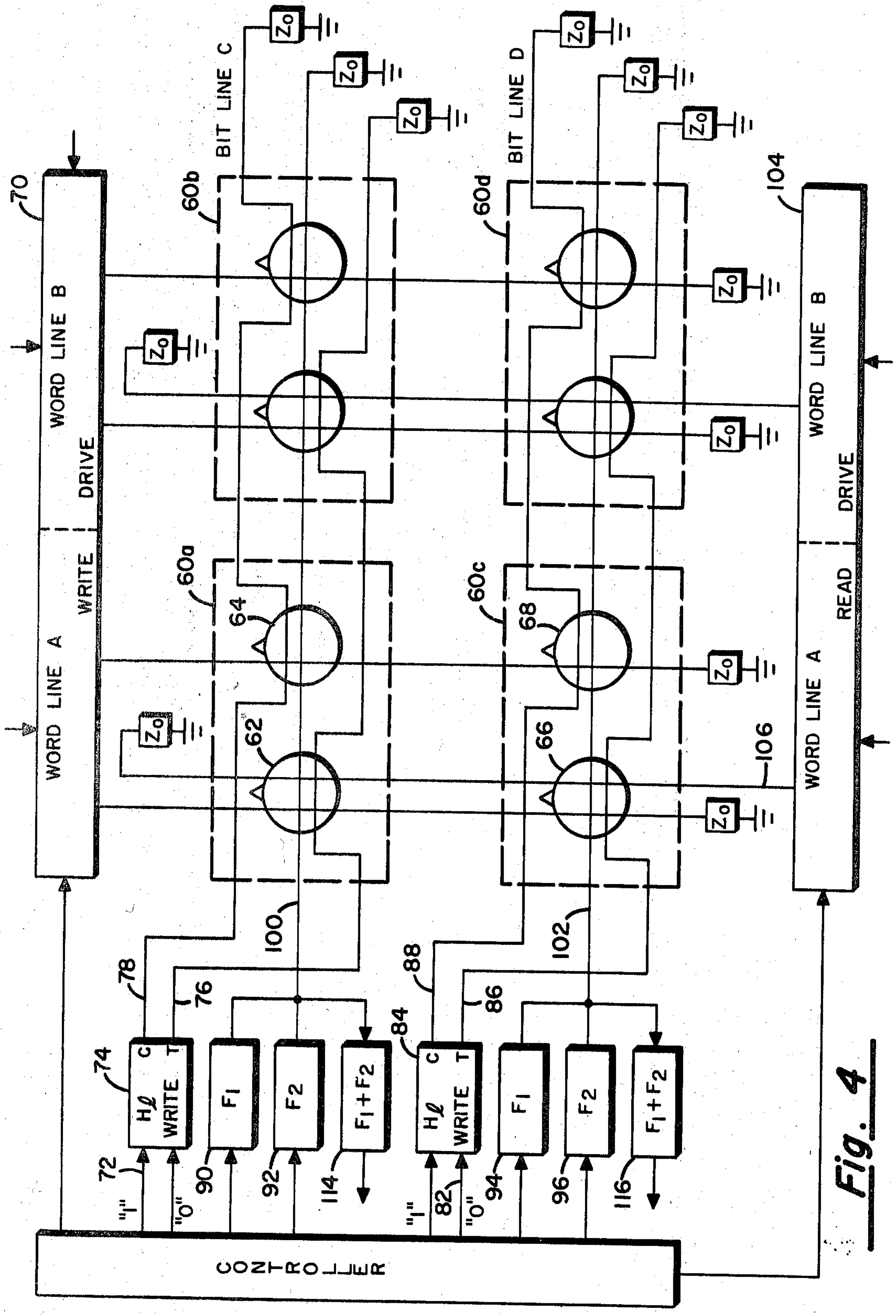
FIG. 4 is an illustration of a two-dimensional matrix array utilizing the memory device of FIG. 3.

With particular reference to FIG. 4 there is illustrated a two-dimensional matrix array of memory devices 60*a*, 60*b*, 60*c* and 60*d* arranged along vertically oriented parallel word lines A and B and horizontally oriented parallel bit lines C and D with a memory element 60 located at each intersection of such bit lines and word lines. Each memory device 60 is similar to memory device 40 of FIG. 3 and is operated in a similar manner. By the concurrent application of proper read and/or write current signals along one selected word line and one selected bit line, the memory device 60 at the intersection thereof may be written into or read out of without effecting a deleterious effect upon the memory devices 60 associated with a non-selected word line. As an example of this assume that it is desirable to write a "1" into memory device 60*a* and a "0" into memory device 60*c* both memory devices being associated with word line A.

The write operation utilized by the embodiment of FIG. 4 is similar to that utilized with the embodiment of FIG. 3 which consists of the initial application of a transverse write drive field $H_{tw}$ to elements 62 and 64 of memory device 60*a* and to elements 66 and 68 of memory device 60*c* by write drive means 70. Concurrent with the application of this transverse write drive field to memory devices 60*a* and 60*c*, the "1" trigger 72 is energized causing $H_{lw}$ write source 74 to couple the appropriate polarity current signals from its true and complement terminals T and C to the associated memory devices 60*a* and 60*b* by means of their associated true drive line 76 and complement drive line 78 while "0" trigger 82 is energized causing $H_{lw}$ write source 84 true and complement terminals T and C to couple the appropriate polarity current signals to the associated memory devices 60*c* and 60*d* by means of their associated true drive line 86 and complement drive line 88. The concurrent action of the application of the transverse write drive fields $H_{tw}$ to memory devices 60*a* and 60*c* and of the $H_{lw}$ longitudinal write drive field of a polarity indicative of the writing of a "1" to memory device 60*a* and $H_{lw}$ longitudinal drive field to memory device 60*c* indicative of the writing of a "0" write a "1" into memory device 60*a* and a "0" into memory device 60*c*. As described with respect to FIG. 3 memory devices 60*b* and 60*d* have their magnetizations M substantially uneffected by the application by the associated RF longitudinal write drive fields, no coincident DC transverse write drive field being coupled to the associated word line B.

The read operation utilized by the present embodiment is similar to that utilized by and discussed with respect to the embodiment of FIG. 3. With $F_1$ sources 90 and 94 and $F_2$ sources 92 and 96 coupling their corresponding longitudinal read drive fields $F_1$ and $F_2$ to their associated common bit-sense lines 100 and 102 the application of a DC transverse read-drive field by read drive source 104 coupling the appropriate transverse read-drive field to word line 106 which is coupled to memory element 62 of memory device 60*a* and memory element 66 of memory device 60*c*. Such memory devices 60*a* and 60*c* are caused to produce the sum-frequency output signal $F_1+F_2$ such as signals 110 and 112, respectively, of FIG. 2 to their associated common bit-sense lines 100 and 102, respectively. This read selection of memory devices 60*a* and 60*c* causes $F_1+F_2$ discriminator 114 and $F_1+F_2$ discriminator 116 to emit unique signals such as waveforms 110 and 112, respectively, of FIG. 2 therefrom.

Figure 5:
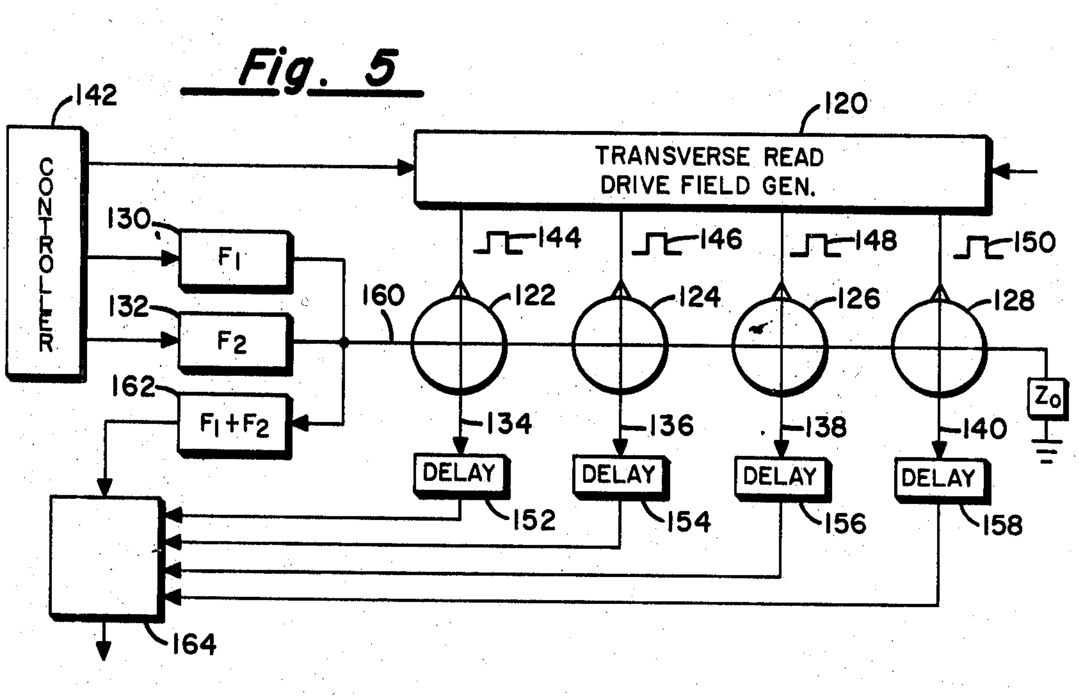
FIG. 5 is an illustration of a further embodiment of the present invention wherein the memory elements are utilized as analog signal sampling detectors.

With particular reference to FIG. 5 there is illustrated another embodiment of the present invention utilizing the memory apparatus of the present invention in which discrete levels of data, such as the amplitude of a sampled analog signal at predetermined sample times have been previously stored in accordance with the above discussed copending application of R. A. White et al. In this embodiment transverse read drive field generator 120 functions as a source of strobe pulses which strobe pulses are coupled to associated transverse read drive lines at predetermined delay intervals. For this operation generator 120 may be of many various forms, as an example a shift register as discussed in the copending patent application R. H. James et al. Ser. No. 579,404, filed Oct. 14, 1966, now Pat. No. 3,431,492, and assigned to the Sperry Rand Corporation as is the present invention. With the flux levels previously established in elements 122, 124, 126, and 128 in accordance with the above discussed copending patent application of R. A. White et al. the read operation is as previously discussed. In an embodiment in which $F_1$ source 130 and $F_2$ source 132 are continuous operating multivibrators, or oscillators, as in the embodiment of FIG. 3, the read operation is initiated by the generator 120 coupling the appropriate transverse read drive fields to memory elements 122, 124, 126 and 128 by means of their respectively associated read drive lines 134, 136, 138 and 140 in an appropriately timed sequence so as to effectuate the serial-like readout of the flux levels in the respectively associated memory elements.

Figure 6:
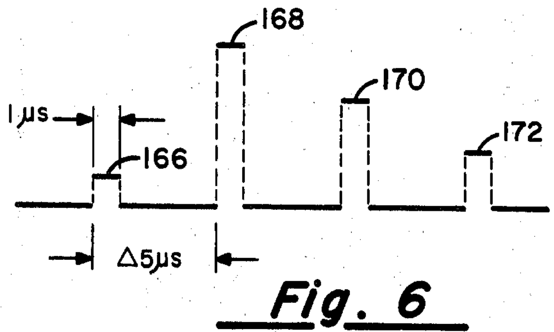
FIG. 6 is an illustration of an example of the nature of the signal read out of the embodiment of FIG. 5.

With particular reference to FIG. 6 there is illustrated an example of the type of information read out from the memory elements of FIG. 5. In this arrangement generator 120 upon proper initiation by controller 142 couples the proper $H_{tr}$ transverse read drive fields, such as discussed with respect to FIG. 1 to memory elements 122, 124, 126 and 128 at successive intervals of $5\mu s$. (microseconds) as illustrated in FIG. 6. Each of the strobe pulses 144, 146, 148 and 150, being of the proper intensity so as to preclude the possibility of any irreversible switching of the magnetization M of the associated memory element, is of a $1\mu s$. duration with such strobe pulses successively coupled to the associated memory elements at successive time periods of $5\mu s$. In order to time the $F_1+F_2$ output signals induced in common bit-sense line 160 with the corresponding storage pulse there are a plurality of delay means 152, 154, 156 and 158 so as to permit the associated $F_1+F_2$ output signal from $F_1+F_2$ discriminator 162 to be gated at output gating means 164 by the associated delayed strobe pulse 144, 146, 148, and 150 thereat. In this arrangement, an output gating means 164 would emit signal levels 166, 168, 170, and 172 therefrom each being representative of the amplitude of the sampled portion of the analog signal previously having been stored in the associated memory elements 122, 124, 126 and 128.

Thus, it is apparent that there has been described and illustrated herein a preferred embodiment of the present invention that provides an improved thin-ferromagnetic-film memory element that utilizes a plurality of concurrent RF longitudinal read drive fields in a pulsed DC transverse read drive field that provides a resultant sum-frequency readout signal which is indicative of the informational state of the memory element. Having now, fully illustrated and described my invention what I claim to be new and desire to protect by Letters Patent is set forth in the appended claims.

1. A thin-ferromagnetic-film memory element using RF mixing for readout operation, comprising:

a thin-ferromagnetic-film layer having single-domain properties and the characteristic of unaxial anisotropy for providing an easy axis along which the remanent magnetization thereof shall lie in a first or a second and opposite direction indicative of the informational state of said film layer;

means for coupling to said film layer first and second different frequency $H_l$ drive fields $F_1$ and $F_2$, each individually and both collectively having an intensity that is below the coercivity $H_c$ of said film layer, for causing said film layer to generate an insubstantial intensity non-read sum-frequency field $F_1+F_2$;

means for coupling to said film layer a DC $H_t$ drive field of an intensity that is below the $H_k$ of said film layer for individually producing no substantial irreversible switching of the magnetization of said film layer; and, means responsive to the concurrent coupling to said film layer of said $H_t$ drive field and of said $H_l$ drive fields $F_1$ and $F_2$ for causing the magnetization of said film layer to produce a substantial amplitude sum-frequency output signal $F_1+F_2$ that is indicative of the informational state of said film layer.

2. The memory element of claim 1 further including writing means coupled to said film layer for setting the magnetization thereof into a first or a second and opposite direction along said easy axis indicative of the writing therein of the informational state of said memory element;

said writing means including $H_{tw}$ write means for coupling a $H_{tw}$ write drive field to said film layer of an intensity that is equal to or greater than the $H_k$ of said film layer, and $H_{lw}$ write means for coupling a $H_{lw}$ write drive field to said film layer of an intensity that is less than the $H_c$ of said film layer and of a polarity that is indicative of the to-be-established informational state of said film layer.

3. An analog storage system, comprising:

a plurality of memory elements according to claim 1 wherein the informational state of the film layer of each of said memory elements is the degree of the partial switching of the magnetization thereof.

4. The analog storage system of claim 3 wherein the informational state of each of said memory elements is representative of the amplitude of a different-time sampled portion of an analog signal.

5. The analog storage system of claim 4 wherein each of said plurality of memory elements upon readout produces a separate signal amplitude, the time-relationship of which separate signal amplitudes defines the waveform of the sampled analog signal.

6. A thin-ferromagnetic-film memory device using RF mixing for readout operation, comprising:

first and second thin-ferromagnetic-film layers, each having single-domain properties and the characteristic of unaxial anisotropy for providing an easy axis along which the remanent magnetization thereof shall lie in a first or a second and opposite direction that is indicative of the informational state of said film layer;

$H_l$ read means for coupling to said first and second film layers first and second different frequency $H_l$ drive fields $F_1$ and $F_2$, each individually and both collectively having an intensity that is below the coercivity $H_c$ of said film layers, for causing said film layers to generate an insubstantial intensity non-read sum-frequency field $F_1+F_2$;

$H_t$ read means for coupling to said first film layer a DC $H_t$ drive field of an intensity that is below the $H_k$ of said film layer for producing no substantial irreversible switching of the magnetization of said film layer; and output means responsive to the concurrent coupling to only said first film layer of said $H_t$ drive field and to both of said first and second film layers of said $H_l$ drive fields $F_1+F_2$ for causing the magnetization of said first film layer to produce an output signal that is indicative of the informational state of said film layer.

7. The memory device of claim 6 further including means coupled to said first and second film layers for setting the magnetization of said first and second film layers into opposite magnetic states indicative of the writing therein of the true and the complement, respectively, of the informational state of said memory device.

8. The memory device of claim 7 wherein said $H_l$ drive fields $F_1$ and $F_2$ produce substantially equal but opposite effects upon the magnetization of said first and second film layers for coupling substantially self-cancelling non-read sum-frequency fields $F_1+F_2$ to said output means.

References Cited

UNITED STATES PATENTS

| | | | |
|---|---|---|---|
| 3,070,783 | 12/1962 | Pohm | 340—174 |
| 3,276,001 | 9/1966 | Crafts | 340—174 |

FOREIGN PATENTS

| | | | |
|---|---|---|---|
| 975,016 | 11/1964 | Great Britain | 340—174 |

STANLEY M. URYNOWICZ, Jr., Primary Examiner